L. A. WILLIAMS.
MEANS AND METHOD FOR ACCOUNTING.
APPLICATION FILED MAR. 26, 1908.

1,084,683.

Patented Jan. 20, 1914.

Witnesses:
Leonard W. Novander.
John C. Michael.

Inventor
Lynn A. Williams
By
Attorneys

L. A. WILLIAMS.
MEANS AND METHOD FOR ACCOUNTING.
APPLICATION FILED MAR. 26, 1908.

1,084,683.

Patented Jan. 20, 1914.
4 SHEETS—SHEET 4.

Witnesses:
Leonard W. Novander,
John C. Michael.

Inventor
Lynn A. Williams
By Brown & Williams
Attorneys

UNITED STATES PATENT OFFICE.

LYNN A. WILLIAMS, OF EVANSTON, ILLINOIS, ASSIGNOR, BY MESNE ASSIGNMENTS, TO WILLIAM R. HEATH, OF BUFFALO, NEW YORK.

MEANS AND METHOD FOR ACCOUNTING.

1,084,683.   Specification of Letters Patent.   Patented Jan. 20, 1914.

Application filed March 26, 1908. Serial No. 423,285.

*To all whom it may concern:*

Be it known that I, LYNN A. WILLIAMS, a citizen of the United States, residing at Evanston, in the county of Cook and State of Illinois, have invented a certain new and improved Improvement in Means and Methods for Accounting, (Case 4,) of which the following is a full, clear, concise, and exact description, reference being had to the accompanying drawings, forming a part of this specification.

My invention relates to methods and means for accounting, and while applicable to various purposes is particularly useful for the concurrent accounting of workmen's time and wages.

My invention provides a current indication of the amount of time and wages with which each workman is to be credited. It provides also a current indication of the total time and wages of any number of workmen. These provisions overcome many of the difficulties which have heretofore been encountered in time and wage accounting.

It has been customary in accordance with the prior art to procure data of the "in" and "out" time of each workman, that is, the beginning and ending time of each period of work. These data have been valuable mainly because it was necessary for the computation of specific elapsed times. These specific elapsed times in turn have been valuable mainly because they were necessary for the computation of the wages due each workman at the end of each week or month. As contrasted with these methods and the associated means of the prior art, my invention provides for the mechanical attainment of the same ultimate results directly and currently from the original ringing in and out operations. The greater part of the drudgery and purely clerical work which has hitherto been deemed inseparable from this important class of accounting is therefore eliminated by the use of my invention, and I am able furthermore to secure a current knowledge of the accrued time and wages, both individual and total, which was not possible with the methods of the prior art.

My invention provides furthermore for a more accurate showing of the required products and totals than it is ordinarily possible to secure when merely the original data are secured mechanically, the final results being secured by mental calculations.

In general, my invention comprises a clock-controlled driving member, which operates continuously or intermittently, as may be preferred. Each workman is provided with a register, which throughout those periods in which he is at work is operatively connected with the driving member. The actuation of the workman's register corresponds, therefore, with the time which elapses during the working period. To each workman's time register is geared an individual wage register, the ratio of gearing being such that for each hour's time which is recorded in the time register the corresponding wages at the appropriate rate will be recorded in the wage register. Both the time and wage registers are operated with substantial continuity throughout the various periods in which the workman is employed, whereby the registers may be inspected at any moment to ascertain the total time and wages with which the workman has been credited. The totals of time and wages are secured by the use of a system of differential gearing. Each time register, for example, is connected with a driving gear of a differential gear, the rotation of the driven gear of a differential being proportional to the sum of the rotations of the associated driving gears. Each driven gear is operated by two driving gears and the driven gears are geared in pairs to drive still other driven gears through proper differential mechanism. The result is that the final gear rotates an amount proportional to the sum of the rotations of all of the primary gears which contribute to it.

The construction and mode of operation will more fully appear from the accompanying drawings, in which—

Like characters of reference are applied to corresponding parts in the various drawings.

Figure 1:
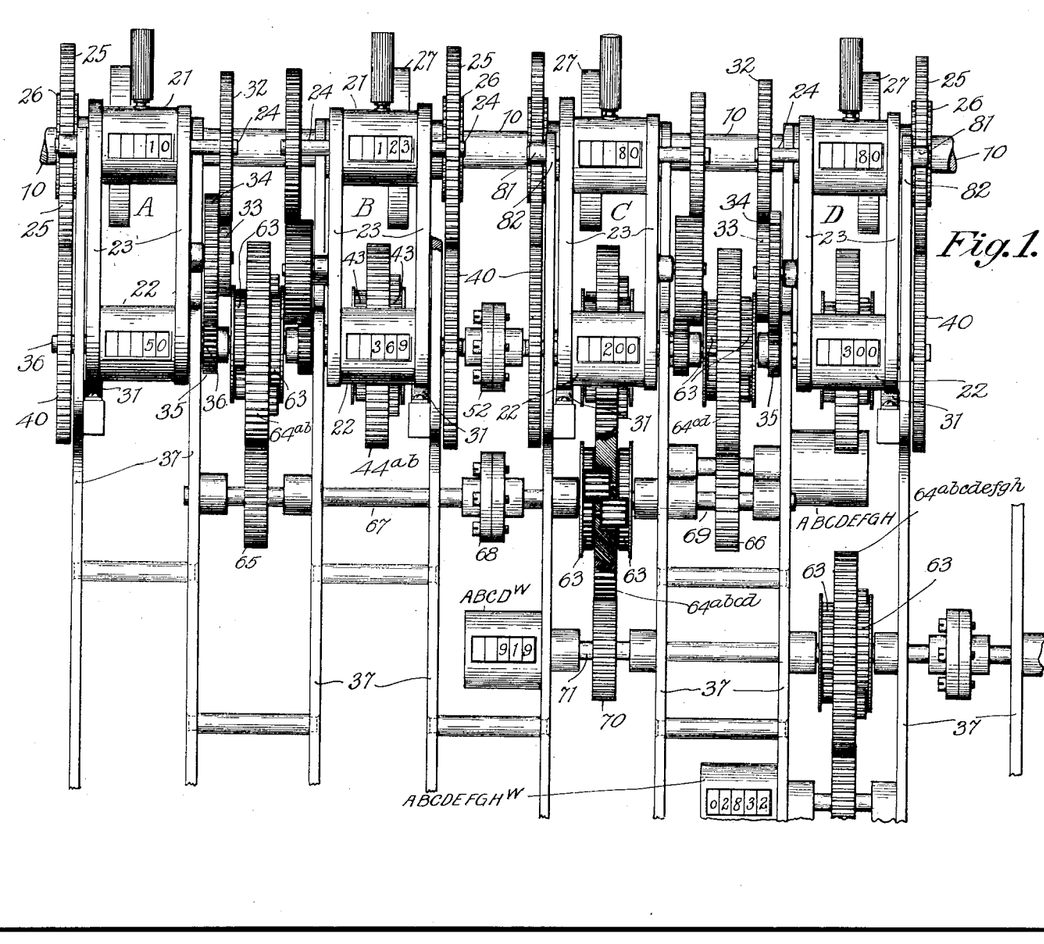
Figure 1 is a front elevation of a section of the accounting machine.
Figure 2:
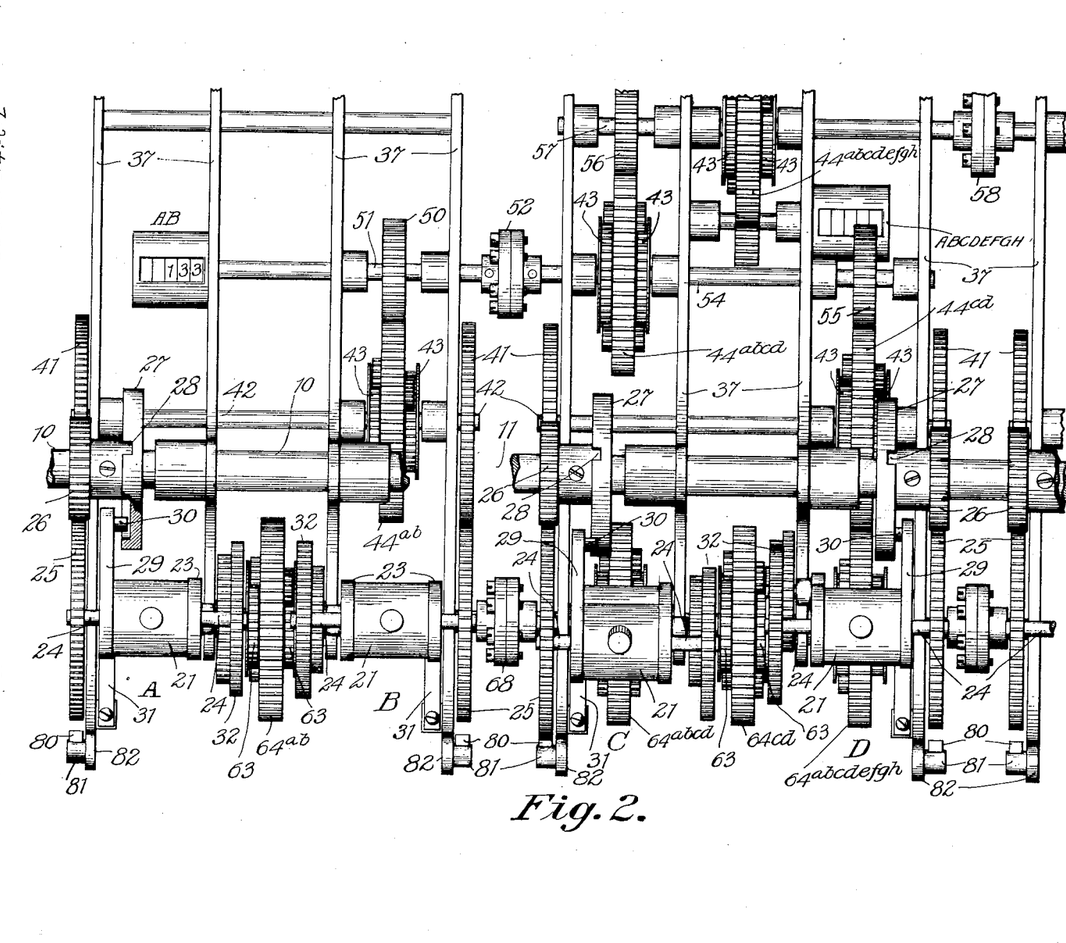
Fig. 2 is a plan view of the same section of the machine.
Figures 4, 5, 6:
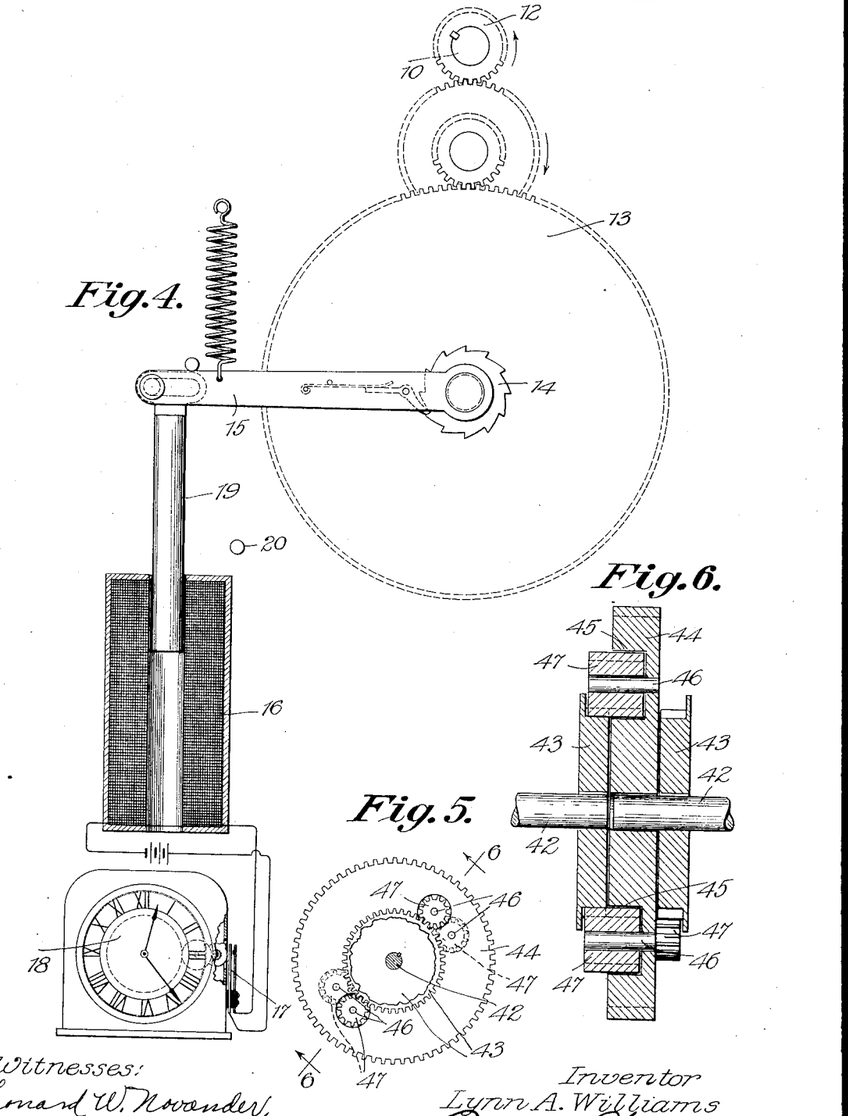
Fig. 4 is an end elevation, partly in diagram, of the mechanism for operating the driving shaft.
Fig. 5 is an elevation of one of the differential gears.
Fig. 6 is a cross-sectional view of the differential gear taken on line 6—6 of Fig. 5.

The clock-controlled driving shaft is shown at 10, a part of the shaft being broken away at 11 to more thoroughly reveal the relations between the various gears employed. In Figs. 1 and 2 the driving shaft is broken off at the left hand end. In reality this shaft is continued toward the left where it is keyed to a driving pinion 12. This pinion is connected by suitable gearing with a main driving gear 13, this driving gear being operated intermittently by the ratchet wheel 14. The ratchet wheel is of course rigidly attached to the main driving gear 13. A lever 15 is caused to reciprocate up and down in accordance with the periodic energization of the electromagnet 16. The circuit of the electromagnet includes the contacts 17, which are controlled by the clock 18. At ten equal intervals during each hour these contacts are closed to energize the electromagnet whereby the plunger armature 19 is drawn outward until the lever 15 strikes the lower stop 20, thus causing a rotation of the ratchet and associated driving gear 13. The ratio of gearing is such that for each energization of the electromagnet the main driving shaft 10 is caused to rotate through one complete revolution and no more. It is this intermittently driven time shaft 10 to which the various registers are connected, as will be more fully explained. It will be understood, of course, that the time shaft is continuously operated in the intermittent manner already described so that any of the registers may be connected with the driving shaft during any desired period of time.

Figure 3:
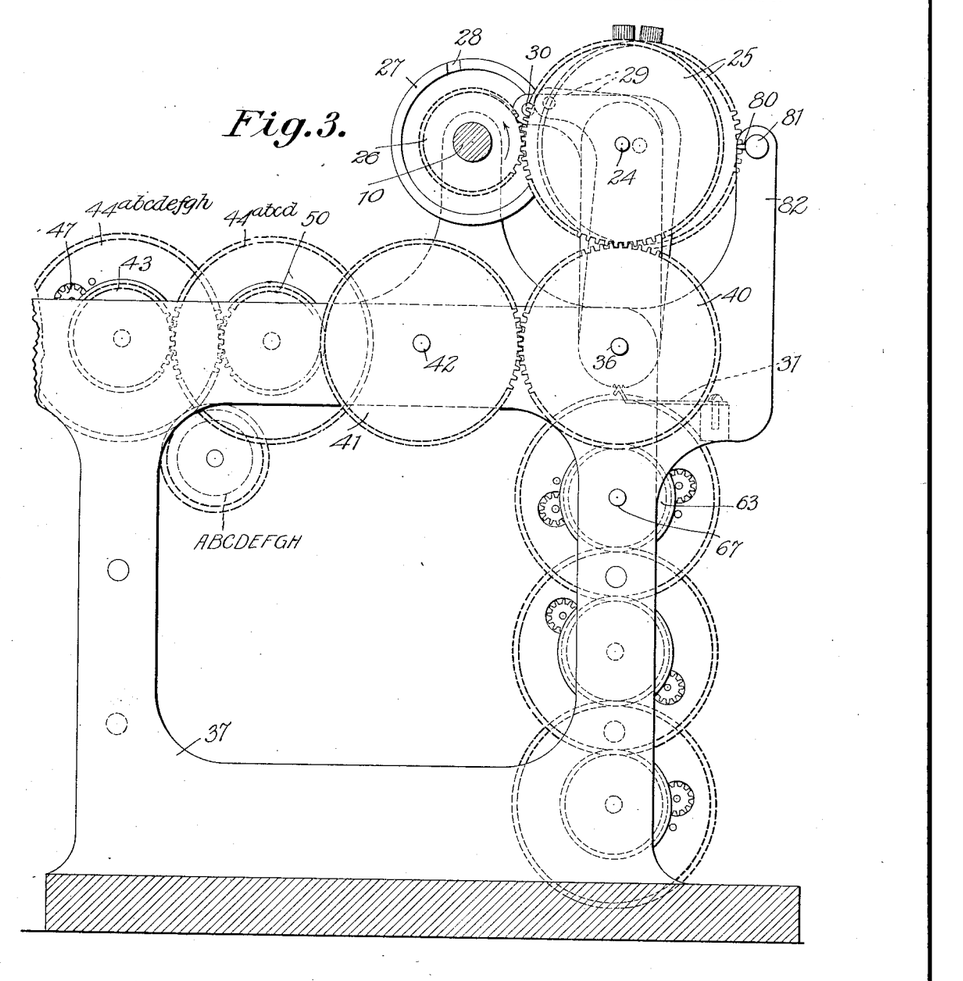
Fig. 3 is an end elevation of the more strictly accounting portion of the machine.

Each workman's time register and wage register are associated together in such a way that the connection of one with the driving shaft will insure the connection of the other also. Each pair of registers is permanently assigned to a particular workman, as, for instance, A, B, C and D, as indicated upon the drawings. The time registers are shown at the top and the associated wage registers at the bottom, the time registers being designated by the reference numeral 21 and the wage registers by the numeral 22. Each pair of registers is mounted between and attached to a pair of side plates 23, 23, each pair being pivoted upon a line concentric with the shaft which drives the wage register. Each time register is provided with an operating shaft 24, at the end of which the operating gear 25 is firmly attached. Directly opposite each of the operating gears there is securely mounted upon the driving shaft 10 a driving gear 26. Thus it is that when a pair of registers is swung on its pivot to the back of the machine the operating gear 25 will be brought into mesh with the associated driving gear 26. The intermittent rotation of the driving gear 26 therefore causes the intermittent rotation of the associated operating gear 25 and consequently the step-by-step advancement of the associated time register. Since the driving shaft makes one complete revolution for every one-tenth of an hour, the ratio of gearing is made such that the numeral wheels of the time register will be driven to indicate the amount of elapsed time, during which the register is in connection with the driving shaft. If the time registers were connected with or disconnected from the time shaft while that shaft is in actual rotation, the result would be fractional indications upon the time registers. In order to avoid this fractional operation in reading I have associated with each of the driving gears 26 a guard disk 27. This dish-shaped disk is provided with a single notch at 28. Corresponding with this notch each pair of registers is provided with a backward extension 29, at the end of which there is a pin 30. This pin is of a size such that it will pass through the notch 28 when in register therewith. The driving shaft always comes to rest between its intermittent rotations in such a position that the notches in the guard disks will permit the registers to be swung in or out of the operating position. It may be well to pause here to explain the mode of operation of this part of the mechanism. When any workman goes to work in the morning he grasps the operating handle associated with his pair of registers, and endeavors to swing that bar into the operating position. If at the instant at which he attempts to operate his pair of registers the driving shaft is in actual rotation, the guard disk will prevent the register from being swung into the operating position until the current rotation has been completed. This rotation take place very rapidly, however, and it will be but an instant before the notch 28 will get into a position such that the workman may throw his registers into the operative position, thus bringing the gear 25 into mesh with the driving gear 26. A spring detent 31, shown most clearly in dotted lines on Fig. 3, aids in maintaining the pair of registers in the position in which it has been placed by the workman. After having been placed in operative position the driving shaft continues to actuate the workman's time register until he quits work at noon. After going out he withdraws his time register from its connection with the driving shaft and gear. Here, again, the change in the position of the register can not be effected except when the driving shaft is in its position of rest. This guard disk, therefore, prevents any fractional operation of the registers both in coming in and in going out. When the workman comes in again after the noon hour he again establishes the operative connection between the driving shaft and his time register. At night the register is disconnected. The result is that each workman's time register is driven by an amount which will cause it to indicate upon its face the amount of time with which the workman is to be credited. It will be apparent that an inspection of the register at any time during the day will show the total amount of time to the credit of the workman. The registers may be set back to the zero position at the end of each week or month or they may continue to run on in the positive direction for an indefinite period of time. If they are set back weekly, as would ordinarily be the case, the total of the workman's time for the week can be read from the face of the register.

Coming now to the indication of the wages earned, it may be stated at the outset that each wage register is geared to the associated time register in a ratio corresponding with the rate of wages. Thus, for example, the wage register 22, which is assigned to workman A, is connected by the gearing 32, 33, 34 and 35 to the spindle 24 in a ratio such that one revolution of the driving shaft 24 of the register 21 causes five revolutions of the driving spindle 36 of the wage register 22. The numeral wheels of the wage register 22 are so ordered as to their decimal point that the indication of one hour of time upon the time register for workman A will be accompanied by an indication of 50 cents upon the dial of the associated wage register. The time and wage registers assigned to workman B are geared together in a 1 to 3 ratio, corresponding with a rate of wages equal to 30 cents per hour. As shown on the drawings workman B has been credited with 12.3 hours time. The corresponding wages, equal to $3.69, are shown upon the dial of the associated wage register. The driving shaft of the time register assigned to workman C is connected with the associated wage register in a ratio of 1 to 2½, corresponding with a rate of wages equal to 25 cents per hour and the eight hours time with which workman C has been credited corresponds with a showing of $2 upon his wage register. The time and wage registers assigned to workman D are geared together in a ration of 1 to 3.75, corresponding with a rate of wages equal to 37½ cents per hour. The showing of $3 upon D's wage register corresponds, therefore, with the eight hours time with which his time register shows him to have been credited. The spindles 36 of the wage registers extend through the journals provided at the frame plates 37 on through the side of said plates 23, and thus perform the function not only of driving the wage register but pivoting the pairs of registers so that they may be swung in or out of mesh with the shaft gears.

We come now to the means for totalizing the operation of registration of the individual registers. Referring first to the means for totalizing the time, there is loosely mounted upon the free end of each of the spindles 36 an idle gear 40. These idle gears are of the same size as the operating gears 25, which are connected with the time register spindles 24, each operating gear 25 being permanently in mesh therefore with an idle gear 40. The idle gear 40 being concentric with the axis upon which the pairs of registers are swung in or out of operating position, the center of the idle gear is maintained in fixed position regardless of the position in which the associated operating gear 25 may be placed. The sole function of each idle gear 40 is to connect the associated time register with one side of a differential gear. This is accomplished in each instance by means of a gear 41 permanently in mesh with the idle gear 40. It may be stated here that the mechanism for totalizing the time is run back from the registers in a horizontal plane while the mechanism for returning the wages is run downwardly in a substantially vertical plane. Each of the connecting gears 41 is mounted upon one end of a spindle 42, upon the other end of which is mounted one driving gear 43 of a differential gear. The end of one of the spindles 42 is continued through it, as best illustrated in Fig. 6, to form a stud upon which the common gear 44 of the differential may rotate. The driving gears 43, 43 are in each instance keyed to the end of a connecting shaft 42, so that the motion of each time register is transmitted to a driving gear 43, which forms a part of the differential totalizing gear. The arrangement of the differential gear is such that the motion of the two associated driving gears 43, 43 is combined to determine the rotation of the common gear 44. The common gear is provided with two pairs of pinions, one pair on each side of the common gear. As best illustrated in Fig. 6, a circular hole or well is bored into one side of the common gear at 45. Another well or hole is sunk in the opposite face of the common gear, the two wells overlapping, as best illustrated in Fig. 5. A pivotal stud 46 is centrally located in each of the wells so that when a connecting pinion 47 is slipped over each of the studs the teeth of the pinions will intermesh at their inner ends. The outer end of each pinion meshes a driving gear 43. As many pairs of pinions may be placed around the periphery of the driving gears as may be found necessary to transmit the necessary power. The result of this construction is that when both of the driving gears of a given differential are rotated in the same direction and at the same speed, the common gear 44 will make the same number of revolutions as the driving gears 43. If one of the driving gears 43 is brought to rest while the other continues in motion, the common gear 44 will be caused to make exactly one-half as many revolutions as are made by the moving gear 43. If one of the driving gears 43 were to rotate in a forward direction and the other to rotate in a backward direction at the same speed, the common gear 44 would remain stationary. When these facts are understood it will be apparent to those skilled in the art that the driving gear 44 will in all cases be caused to rotate by an amount proportional to the sum of the rotations of the associated driving gears 43, 43. If, therefore, a register were geared to the common gear 44 this register would indicate at all times the total of the registrations of the registers respectively connected with the two driving gears 43, 43. Referring, for example, to Fig. 2, it will be apparent that the common gear $44^{ab}$ will be rotated by an amount corresponding with the sum of the rotations of the spindles 24, 24 of the time registers assigned to workmen A and B. The common gear $44^{ab}$ is in mesh at a 2 to 1 ratio with a transmitting gear 50, this gear being fixedly mounted upon the shaft 51. This shaft 51 is at one end connected with a totalizing register AB, which indicates at all times the totals of the registrations in the time registers assigned to workmen A and B. As shown in the drawings, this register AB indicates a total of 13.3 hours, which is the total of one hour in the register assigned to workman A and 12.3 hours in the register assigned to workman B. The connecting shaft 51 is continued through a coupling 52 to one of the driving gears 43 of a differential, whose common gear is designated $44^{abcd}$. The other driving gear 43 of this differential is driven by means of a shaft 54 and a gear 55, which is in mesh with the common gear $44^{cd}$ of another differential whose driving gears 43, 43 are respectively connected with the spindles of the time registers assigned to workmen C and D. It will be apparent that the amount of rotation of the common gear $44^{abcd}$ is proportional to the sum of the rotations of the spindles of the time registers assigned to workmen A, B, C and D. The common gear $44^{abcd}$ is in mesh at a 2 to 1 ratio with a driving gear 56, mounted upon a spindle 57, at the other end of which is fixed a driving gear 43 of a differential whose common gear is designated $44^{abcdefgh}$. The right hand driving gear 43 of this differential is connected by means of the coupling 58 with a driving gear in mesh with the common gear of a differential which totals the rotation of other registers assigned to workmen E, F, G and H, these registers and their mechanism not being shown, however, in the drawing. To the common gear $44^{abcdefgh}$ is geared a totalizing register ABCDEFGH. This register indicates at all times the total time with which the eight workmen have been credited. While the machine is in operation the totalizing register is driven at a rate proportional to the number of workmen employed. An inspection of this totalizing register will show at all times the total time which all of the workmen have worked. A greater or less number of workmen's time can be accounted in substantially the same manner and a greater or less number of intermediate totals can be secured by connecting appropriate registers at intermediate points in the mechanism in the manner in which the register AB is connected to indicate the total of workmen A and B, who, for instance, may be assumed to be employed in a single department. In this manner the total time for each department may be indicated as well as the time of each individual workman and the total time for a large factory having a number of departments.

The mechanism for totalizing accrued wages of the individual workmen is in many respects like that employed for totalizing the time. The wage totalizing mechanism is, however, arranged vertically instead of horizontally. Upon the inner end of each of the spindles of the wage registers there is mounted the driving gear 63 of a differential gear, whose common gear is shown at 64, various indices being affixed to indicate the function of the various common gears. Thus the common gear $64^{ab}$ is rotated an amount proportional to the sum of the actuations of the wage registers assigned to workmen A and B. The common gear $64^{cd}$ is rotated an amount proportional to the sum of the actuations of the wage registers assigned to workmen C and D. The common gears $64^{ab}$ and $64^{cd}$ are each loosely mounted upon the projecting end of a wage register spindle, as indicated in Fig. 6. The common gears are not therefore controlled directly by either of the wage register spindles, but only by the conjoint operation of the two spindles which act through the driving gears 63 to determine the motion of the common gear. The common gears are respectively in mesh with driving gears 65 and 66, the gear 65 operating through the driving shaft 67 and the coupling 68 to actuate a driving gear 63, which, together with the other driving gear 63 which is mounted upon the end of the driving shaft 69, serves to control the motion of the common gear $64^{abcd}$. In like manner the common gear $64^{acbd}$ is connected with a driving gear 70, a totalizing register $ABCD^w$ being operated by the driving shaft 71 upon which the gear 70 is mounted. The common gear $64^{acbdefgh}$ is operated in the manner already described to totalize the wages earned by the workmen A, B, C and D and also the wages earned by four other workmen having similar registering mechanism, which is not, however, shown in the drawings. The final totalizing register $ABCDEFGH^w$ shows at all times the grand total of the wages earned by all of the workmen.

When one or more of the wage registers is disconnected from the driving shaft there arises a condition in which the motion transmitted to the connected register or registers may be transmitted either through the totalizing mechanism or backwardly through the disconnected register. In order to prevent any backward rotation of the disconnected registers, I provide means for positively holding such registers against rotation except when they are connected with the driving shaft. This means takes the form of a detent or single gear tooth 80, mounted in proximity to the operating gears 25. The detents are carried upon studs 81, which in turn are carried upon projecting arms 82 of the framework. It will be seen, as in the case of the registers assigned to workman C, that when these registers are thrown out of connection with the driving shaft the operating gear 25 will be brought into relation with the detent tooth 80. This detent in conjunction with the retaining spring 31, which holds the operating gear in engagement with the detent tooth, will prevent any backward rotation which would otherwise interfere with the proper operation of the machine.

With this explanation, the many advantages of my invention will be understood. A general manager or superintendent can ascertain from an inspection of the machine at any time of any day just what wages have been earned by any of the workmen, also the cost of the work which has been done in any department and also the total wages which have accrued. At the end of the week no calculations will be required in order to determine the wages to be paid each workman. All that is necessary is to fill the pay envelops in accordance with the readings of the individual wage registers. The amounts put in the envelops may be listed and added either mentally or by the use of an adding machine, and if the total agrees with the total as indicated by the totalizing wage register herein described, the paymaster may be very certain that the pay envelops have been properly filled and that each man has been paid the wages due him.

This invention provides a means whereby each workman may from an investigation of his time and wage registers know just what credit he has been given at any time. In view of the absolute accuracy with which a workman's time and wages must necessarily be made to appear upon the proper registers, the machines when put in use will soon serve as a means for avoiding any disputes or questions between employer and employee as to the time and wages with which a workman is to be credited. At the end of any desired period, as, for instance, at the end of the week, the paymaster by disconnecting the clock-controlled driving mechanism may connect the various registers with the driving shaft and by running the driving shaft backward he may return each of the registers to its zero position. Each individual register as it reaches the zero position may be disconnected from the driving shaft. The result will be that when all of the individual registers have been returned to their zero positions the totalizing registers will be found also in their zero positions.

While I have herein described a preferred embodiment of my invention, it will be apparent to those skilled in the art that many modifications and changes may be made without departing from the spirit thereof. I do not wish, therefore, to be limited to the precise details herein shown, but Having described my invention I claim as new and desire to secure by Letters Patent:

1. In combination, a clock controlled driving shaft, a plurality of individual workman's wage registers, a means for connecting each wage register for any desired period of time with the driving shaft in a ratio corresponding with the rate of the workman's wages, a wage totalizing register, and differential gearing for connecting the wage totalizing register with the driving shaft in a ratio corresponding with the sum of the rates at which the individual wage registers are being operated.

2. In combination, a clock controlled driving shaft, a plurality of individual workman's wage registers, a means for connecting each wage register for any desired period of time with the driving shaft in a ratio corresponding with the rate of the workman's wages, a wage totalizing register, differential gearing for connecting the wage totalizing register with the driving shaft in a ratio corresponding with the sum of the rates at which the individual wage registers are being operated, an individual workman's time register associated with each individual workman's wage register, and means for connecting each time register with the driving shaft when the associated wage register is operatively connected with the driving shaft.

3. In combination, a clock controlled driving shaft, a plurality of individual workman's wage registers, a means for connecting each wage register for any desired period of time with the driving shaft in a ratio corresponding with the rate of the workman's wages, a wage totalizing register, differential gearing for connecting the wage totalizing register with the driving shaft in a ratio corresponding with the sum of the rates at which the individual wage registers are being operated, an individual workman's time register associated with each individual wage register, means for connecting each time register with the driving shaft when the associated wage register is operatively connected with the driving shaft, a time totalizing register, and differential gearing for connecting the time totalizing register with the driving shaft in a ratio corresponding with the number of the individual workman's time registers connected with the driving shaft.

4. In combination, a differential gear comprising driving gears and a common gear whose motion is derived from and jointly controlled by the driving gears, a register connected with each driving gear to indicate the motion thereof, and a register connected with the common gear to indicate the motion thereof.

5. In combination, a differential gear comprising driving gears and a common driven gear whose motion is derived from and jointly controlled by the driving gears, a register connected with the common gear to indicate and record the motion thereof, a driving shaft rotating at a constant rate, and means for operatively connecting any of the driving gears with said common driving shaft.

6. In combination, a differential gear comprising driving gears and a common driven gear whose motion is derived from and jointly controlled by the driving gears, a register connected with the common gear to indicate and record the motion thereof, a common clock controlled driving shaft, means for operatively connecting any of the driving gears with said common driving shaft, and means to prevent motion of any driving gear when disconnected from the driving shaft.

7. In combination, a differential gear comprising driving gears and a common driven gear whose motion is derived from and jointly controlled by the driving gears, a register connected with the common gear to indicate and record the motion thereof, a common driving member, means for operatively connecting any of the driving gears with said common driving member, and means to prevent the motion of any driving gear when disconnected from the driving member.

8. In combination, a clock controlled driving mechanism, a plurality of transmission mechanisms, each assigned to a particular workman, means associated with each transmission mechanism for connecting it with the driving mechanism for any desired period of time, a differential gear having a common gear whose motion is derived from such transmission mechanisms, and a register connected with the common gear of the differential.

9. In combination, a clock controlled driving mechanism, a plurality of transmission mechanisms adapted to transmit power in different ratios from the driving mechanism and each assigned to a particular workman, means associated with each transmission mechanism for connecting it with and disconnecting it from the driving mechanism, a differential gear having a common member whose motion is derived from said transmission mechanisms, and a register connected with the common member of the differential.

10. In combination, a plurality of direct reading individual time registers, each adapted to indicate the amount of its total actuations, a clock controlled actuating mechanism, means for connecting each of the individual time registers with the actuating mechanism during the periods of time to be accounted in each such register, a direct reading individual wage register associated with each time register and operatively connected therewith in a predetermined gear ratio whereby the operation of any time register is accompanied with a corresponding operation of the associated wage register, a time totalizing register, differential gearing connecting the time totalizing register with the individual time registers in ratios such that the actuation of the time totalizing register shall be proportional to the sum of the actuations of the individual time registers, a wage totalizing register, and differential gearing connecting the wage totalizing register with the individual wage registers in ratios such that the actuation of the wage totalizing register shall be proportional to the sum of the actuations of the individual wage registers.

11. In combination, a plurality of direct reading individual time registers, each adapted to indicate the amount of its total actuations, a clock controlled actuating mechanism, means for connecting each of the individual registers with the actuating mechanism during the periods of time to be accounted in each such register, a direct reading individual wage register associated with each time register and operatively connected therewith in a predetermined gear ratio whereby the operation of any time register is accompanied with a corresponding operation of the associated wage register, a totalizing wage register, and differential gearing whose common member is connected with said wage totalizing register and whose driving gears are connected with the individual wage registers.

12. In combination, a plurality of direct reading registers, each adapted to indicate the amount of its total actuations, a clock controlled actuating mechanism, means for connecting each of the individual registers with the actuating mechanism during any desired period of time, a totalizing register, and differential gearing for connecting the totalizing register with the actuating mechanism in various ratios corresponding with the sum of the rates of actuation of the individual registers.

13. In combination, a plurality of direct reading individual time registers, each adapted to indicate the amount of its total actuations, means for connecting each of the individual registers with the actuating mechanism during the periods of time to be accounted in each such register, a time totalizing register, and differential gearing for connecting the time totalizing register with the actuating mechanism in various ratios corresponding with the varying number of individual time registers connected with the actuating mechanism.

14. In combination, a plurality of direct reading individual registers each assigned to a different workman's account, means for actuating any of said individual registers, a clock for controlling the rate of actuation of said individual registers, a totalizing register, and differential gearing whose common member is connected with the totalizing register and whose driving members are connected with the individual registers.

15. In combination, a plurality of direct reading individual registers each assigned to a different workman's account, means for actuating any of said registers, the ratio of the connection between each register and the actuating means corresponding with the rate of wages of the workman to whom that register is assigned, a clock for controlling the rate of actuation of said registers, a totalizing register, and differential gearing for automatically actuating the totalizing register by an amount proportional to the sum of the actuations of said individual registers.

16. In combination, a plurality of individual registers, a common uniformly driven actuating mechanism, means for connecting any two individual registers concurrently with the actuating mechanism, a totalizing register, and differential gearing for actuating the totalizing register in conformity with the sum of the actuations of the individual registers.

17. In combination, a plurality of individual registers, a common uniformly driven actuating mechanism, means for connecting a plurality of the individual registers concurrently with the actuating mechanism, the ratio of the connection of the registers with the common actuating mechanism corresponding with the differing rates of wages, a totalizing register, and differential gearing having its common member connected with the totalizing register and its driving gears connected with the individual registers whereby the actuation of the totalizing register corresponds with the sum of the actuations of the individual registers.

18. In combination, a plurality of time registers and a plurality of associated wage registers, the wage registers being geared to the time registers in various ratios corresponding with the rates of wages of the workmen to whom the registers are assigned, differential gearing for totalizing the actuations of the time registers, and differential gearing for totalizing the actuations of the wage registers.

19. In combination, a plurality of registers, means for actuating said registers, and differential gearing for totalizing the actuations of said registers.

20. In combination, a plurality of individual time registers, a clock-governed mechanism for controlling the actuation of any of the time registers connected therewith, means for connecting any of the time registers with the actuating mechanism, a wage register geared to each time register in the ratio of the rate of wages, and differential gearing for totalizing the actuations of the wage registers.

21. In combination, a plurality of individual registers, a totalizing register, means for actuating two or more of the individual registers at different rates, and differential gearing for automatically actuating the totalizing register at a rate proportional to and varying as the sum of the rates of actuation of the individual registers.

22. In combination, a plurality of direct reading individual registers each assigned to a different workman's account, means for actuating any of said registers, the ratio of the connection between each register and the actuating means corresponding with the rate of wages of the workman to whom that register is assigned, a clock for controlling the rate of actuation of said registers, a totalizing register, and means for automatically actuating the totalizing register by an amount proportional to the sum of the actuations of said individual registers.

23. In combination, a plurality of individual time registers, a clock-governed mechanism for controlling the actuation of any of the time registers connected therewith, means for connecting any of the time registers with the actuating mechanism, a wage register geared to each time register in the ratio of the rate of wages, and means for totalizing the actuations of the wage registers.

24. In combination, a plurality of individual registers, a totalizing register, means for actuating two or more of the individual registers at different rates, and means for automatically actuating the totalizing register at a rate proportional to and varying as the sum of the rates of actuation of the individual registers.

25. In combination, a plurality of individual registers, a totalizing register, a uniformly driven actuating mechanism, transmission gears for connecting any of the registers with the actuating mechanism, the ratio of transmission being different in the case of different registers, and means for automatically connecting the totalizing register with the actuating mechanism through a transmission gear having a ratio of transmission corresponding with the sum of the rates of actuation of the individual registers.

26. In combination, a plurality of individual registers each assigned to a different workman's account, a uniformly driven actuating mechanism, means for operatively connecting any register with the actuating mechanism during the periods of time for which the workman to whom that register is assigned is to be credited, the ratio of transmission being different in the case of different registers and in each case corresponding with the rate of wages of the workman to whom the register is assigned whereby each register will totalize the individual workman's credits as earned, and means for automatically totalizing the entries in all of the individual registers.

27. In combination, a uniformly driven actuating mechanism, a plurality of wage registers, a transmission gear associated with each wage register, means for connecting any wage register through the associated transmission gear with the common actuating mechanism, the ratio of transmission provided by the gear associated with some of the registers being different from that provided by the gear associated with the other registers and corresponding in each instance with the rate of wages of the workman to whom the individual wage register is assigned, and means for automatically totalizing the actuations of all of the individual registers.

28. In combination, a uniformly driven actuating mechanism, a plurality of wage registers, a transmission gear associated with each wage register, means for connecting any wage register through the associated transmission gear with the common actuating mechanism, the ratio of transmission provided by the gear associated with some of the registers being different from that provided by the gear associated with the other registers and corresponding in each instance with the rate of wages of the workman to whom the individual wage register is assigned, a totalizing register, and a differential gear whose common member is connected with the totalizing register and whose driving members are connected with the individual registers.

29. In a wage accounting machine, the combination of a plurality of individual entry-receiving devices, means for actuating said individual entry-receiving devices at various rates, a totalizing entry-receiving device, and differential gearing for operating said totalizing entry-receiving device at a rate proportional to the sum of the rates at which the individual entry-receiving devices are operated.

30. In a wage accounting machine, the combination of a plurality of individual entry-receiving devices, means for actuating the individual entry-receiving devices at various rates but with substantial continuity throughout the periods of time for which the appropriate wages are to be accounted, and means for automatically totalizing the entries in all of the individual entry-receiving devices.

31. In an accounting mechanism, the combination of a time controlled driving shaft, a plurality of individual wage registers associated therewith, means for operatively connecting any one of said wage registers or any number thereof with said shaft in a suitable transmission ratio, and a register for concurrently indicating the total amount of actuation of the respective wage registers.

32. In an accounting mechanism the combination of a time controlled driving shaft, a plurality of individual wage registers associated therewith, means for operatively connecting any one of said wage registers or any number thereof with said shaft in a suitable transmission ratio and a register for indicating the total amount of actuation of the respective wage registers.

33. In combination, two individual registers, means for driving either or both of such registers as desired, a totalizing register and differential mechanism between the individual registers and the totalizing register for operating the latter at a rate proportional to the operation of the individual registers.

34. In combination, two individual registers, a common operating member, means for connecting the registers as desired to the operating member, a totalizing register, and differential mechanism between the individual registers and the totalizing register for operating the latter at a rate proportional to the added operation of the individual registers.

35. In combination, two individual registers adapted to be actuated either concurrently or successively as desired, a totalizing register, mechanism between the individual registers and the totalizing register for actuating the totalizing register proportionally to the sum of the actuations of the individual registers.

36. In combination, two individual registers adapted to be concurrently actuated, a totalizing register, mechanism between the individual registers and the totalizing register for actuating the totalizing register proportionally to the sum of the actuations of the individual registers.

In witness whereof I hereunto subscribe my name this 24th day of March, A. D., 1908.

LYNN A. WILLIAMS.

Witnesses:
WILLIAM J. CRUMPTON,
CHARLES H. TALLMADGE.